Dec. 14, 1937.   J. S. ALCORN   2,101,835
HEAT TRANSFER SYSTEM
Original Filed March 12, 1928
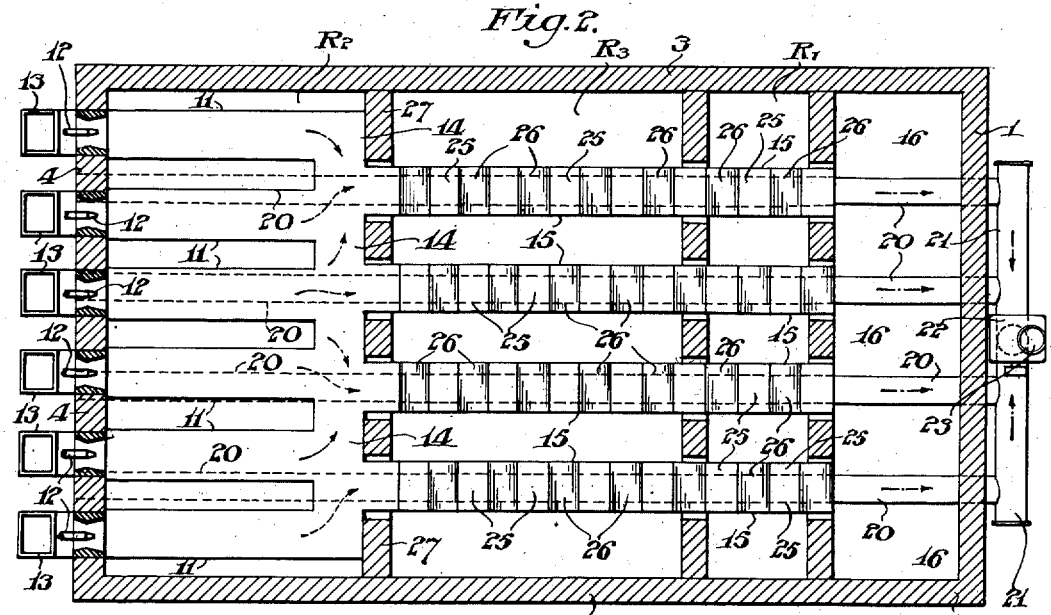
Fig. 2.
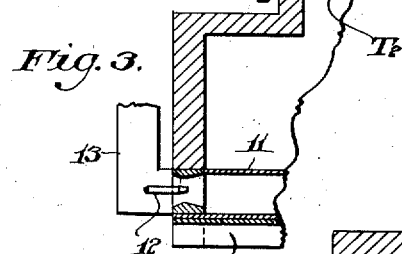
Fig. 3.
Fig. 1.
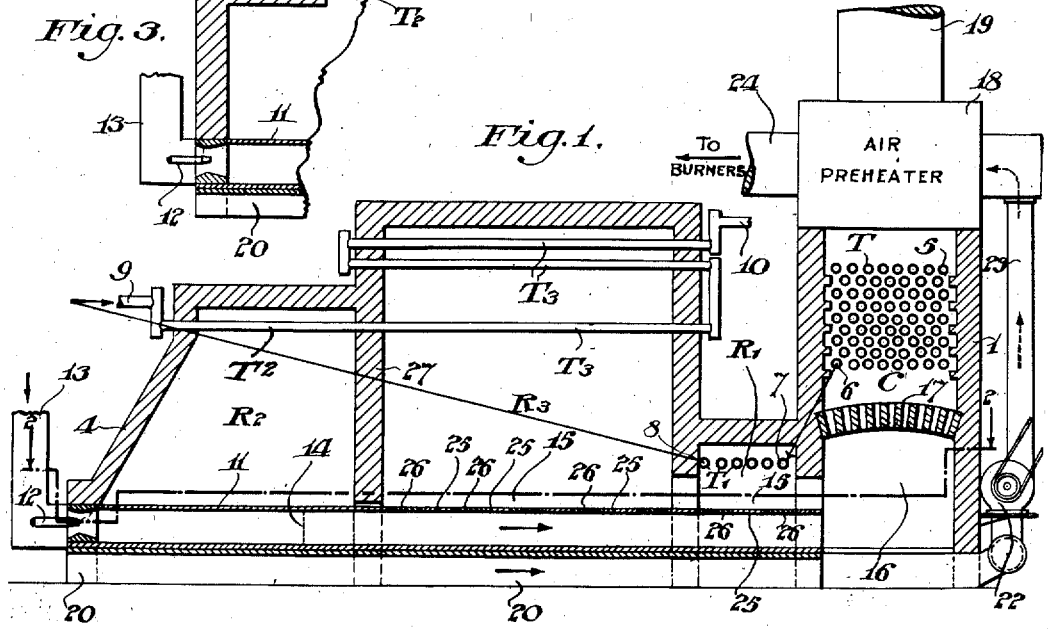
Inventor:
James S. Alcorn
By Cornelius L. Ebret
his Attorney Patented Dec. 14, 1937

2,101,835

UNITED STATES PATENT OFFICE 2,101,835

HEAT TRANSFER SYSTEM

James S. Alcorn, Wynnewood, Pa., assignor to Alcorn Combustion Company, Philadelphia, Pa., a corporation of Delaware Application March 12, 1928, Serial No. 260,956
Renewed February 3, 1936

29 Claims. (Cl. 196—47)

My invention relates to a system of heat transfer to absorption structure, more particularly of the tubular type, of systems or stills, particularly for the distillation or cracking of oils, particularly petroleum, of steam generators, and the like.

In accordance with my invention, heat, generated by combustion or equivalent, is transferred substantially exclusively by radiation in a plurality of distinct zones or chambers to heat absorption structures disposed therein, at materially different rates, either to different materials in the different heat absorption structures, or, and generally, to one and the same material, as liquid, vapor or gas, or mixture of two or more thereof, which is passed in succession through the different heat absorption structures and preferably first passed through the zone or chamber in which heat is applied by radiation at the higher rate.

More particularly in accordance with my invention the system may comprise a further zone or chamber in which heat from the same source is applied by convection to a further heat absorption structure in which may be disposed a different material, or through which the same material is passed either before or after passing through one or more of the aforesaid radiantly heated zones or chambers.

Further in accordance with my invention in a system comprising three or more heat absorption structures one of them may be heated substantially solely by radiation or convection, another at very high rate substantially solely by radiation, and the third at materially lower rate by radiation or convection, and the material to be heated may be passed through said structures in any desired sequence, but preferably in the order named.

Further in accordance with my invention, for controlling the rate of transfer of heat by radiation from a radiation combustion chamber, its refractory radiating wall comprises a plurality of components of substantially different heat conductivities or radiating powers, whereby, by proportioning with respect to each other the extents of radiating surfaces of the different components, the average rate of heat radiation may be controlled or determined.

Further in accordance with my invention a plurality of radiation combustion chambers discharge their gases, preferably through an intervening manifold, into one or more radiating combustion chambers whose total cross-section is less than the total cross-section of the first named chambers; and more particularly the last named combustion chamber or chambers are of the character aforesaid having components of different characteristics.

Further in accordance with my invention oil as petroleum or component or product thereof, is passed through the heat absorption structures in succession to effect either simple distillation or destructive distillation or cracking, and in the operation the oil may be either in the liquid or vapor phase, in mixed phase, or in part of the system may be in liquid phase and in another part in vapor phase.

My invention resides in the method, system and apparatus of the character hereinafter described and claimed.

For an understanding of my method and for an illustration of some of the various forms my structure may take, reference is to be had to the accompanying drawing, in which:

Fig. 1 is a vertical sectional view, parts in elevation of a heat transfer system embodying my invention.

Fig. 2 is a horizontal sectional view, parts in plan, taken on the line 2—2 of Fig. 1.

Fig. 3 is a fragmentary vertical sectional view, parts in elevation, of a modified structure.

By way of example the system will be described from the aspect of destructively distilling or cracking petroleum, or a component or a product thereof.

Referring to Figs. 1 and 2, there are formed or disposed within the outer walls 1, 2, 3, and 4, four chambers or zones C, R1, R2 and R3. In the chamber C is disposed heat absorption structure comprising a bank of horizontally disposed tubes T through which the oil entering at 5 traverses in succession, either one tube at a time, or any number of tubes in parallel. The oil passes out at 6 and enters at 7 into a second heat absorption structure comprising a group of tubes T1 in the chamber R1 and is discharged at 8 to the inlet 9 of the tubular heat absorption structure T2 in chamber R2 comprising a plurality of tubes side by side or in any way suitably grouped and communicating with the tubular heat absorption structure T3 in the chamber R3, the tubes in this chamber being again traversed either singly in succession or in suitable groups, and the oil is eventually discharged from the system at 10 to reaction chamber, tower, condenser or other destination suitable to the particular process involved. Any suitable pressure may be maintained in the heat absorption structures. For example high super-atmospheric pressure may exist in all or any of them.

Extending along the bottom of the chamber R2 are the several radiation combustion chambers 11 at whose inlets are disposed the burners 12 from which is discharged fuel which burns within the chambers 11 in air supplied to those chambers through the ducts 13. The gases are discharged in the transversely extending manifold 14 which itself is or may be a radiation combustion chamber, and thence into the radiation combustion chambers 15 which are disposed in the bottoms of the chambers R3 and R1. The chambers 15 discharge their gases into the chamber 16 in which they rise, passing through the perforated arch 17 between and around the tubes T, through the air preheater 18 and thence to flue 19 which connects with the stack.

The air for supporting combustion enters the left ends of the air ducts 20 passing beneath combustion chambers 11 and 15, thence to the manifold 21 from which it discharges to the suction of the pump or blower 22 from which it is discharged through the duct 23 into the preheater 18 from which it is discharged at 24 and delivered into the aforesaid ducts 13.

The top walls, or the side wall in addition, of the radiation combustion chambers 11 are preferably constituted of highly refractory material, as metal, or non-metallic materials, such as silicon carbide or carborundum or the like having high heat conductivity and capable of withstanding high temperatures of incandescence up to for example 3,000° F. or higher.

In the radiant heat chamber R3 the radiation combustion chambers 15 have a total internal cross section of gas passage less than the total internal cross section of gas passages of the chambers 11 in the radiation chamber R2. The heat radiated from the radiation combustion chambers 11 abstracts heat from the gases of combustion, materially cooling them, and in consequence their volume is less when passing through the radiation combustion chambers 15 whose total cross sectional area therefore may be less.

In the arrangement shown the absorption by tubes T2 of radiant heat from the chambers 11 in zone R2 is at very high rate, such, for example, as the order of five or ten or more times the rate of absorption of heat by tubes T3 radiated from the radiation combustion chambers 15. This control of different rates of heat radiation and absorption is largely effected by using for the radiating walls of the chambers 11 refractory materials, as carborundum, metal, etc., which have high heat conductivity and therefore, at the high temperatures to which they are raised, as to incandescence, or to the order of 3000° F. or higher, absorb heat from the gases and then radiate it at high rates; while the top walls, and also the side walls if desired, of the radiation combustion chambers 15 particularly within the chamber R3, and also in the chamber R1 if desired, and as shown, are composite in nature, since portions, unshaded, such as 25, are of carborundum, highly refractory metal, or the like, but in any event of high heat conductivity, while others, shaded, such as 26, are of refractory material but of considerably lower heat conductivity. The slabs or components 25 therefore radiate heat at higher rate than do the slabs or components 26, with the result that the total or average rate of heat radiation is lowered, and is very considerably lower than the rate of radiation from the radiation combustion chambers 11 in chamber R2.

In the chamber R1 the radiation of heat to the absorption structure T1 may be at any suitable rate, as high, when only slabs such as 25 are utilized, but in the example illustrated the rate of radiation is lowered by use of both types of slabs 25 and 26.

In Fig. 1 the wall 4 is shown as inclined, affording long radiation combustion chambers 11, 14, the longitudinal extent of these radiation combustion chambers being greater than that of the space occupied by the tubes T2, whether they be parallel with or transverse to the radiating combustion chambers 11, therefore increasing the rate of transfer of heat to the tubes T2 by radiation.

However, my invention is not limited to this feature for, as indicated in Fig. 3, the wall 4 may be vertical and yet afford the greater length of radiation combustion chamber surface than that of the space occupied by the tubes T2 whether parallel with or transverse to chamber 11.

It shall further be understood, however, that the length of the radiation combustion chambers in the chamber R2 may be substantially equal to the length of the tubes T2 in the same chamber.

In a system of the character illustrated, the temperature of the oil or other fluid is first raised by convection heat in the absorption structure T, further raised in the absorption structure T1 by radiation, then greatly further raised in and substantially uniformly throughout the structure T2 by intense radiation where the oil or fluid may, for example, be in the vapor phase, and in the absorption structure T3 the temperature is further raised substantially uniformly throughout but not so rapidly or to such great degree as in the chamber R2.

Though the chambers R1 and R3 may be in communication with the chamber 16, nevertheless the heat transfer in chambers R1 and R3 is substantially solely by radiation, which is also true of the chamber R2.

In accordance with my invention the high rate of heat application in the chamber R2 is effected by radiation. In the chambers R1 and R3, however, the heat transfer may be effected by convection, or partly by radiation and partly by convection as may be suitable or desirable. Accordingly in either of the chambers R1 or R3 the hot gases of combustion may come in contact with the absorption structures T1 or T3, or there may be independent burners for either or both of the chambers R1 and R3, which are then provided with exit passages for the gases or products of combustion.

In the chambers R2 and R3 the tubes T2 and T3 are shown as extending substantially parallel with the longitudinal extents of the radiation combustion chambers 11 and 15. It shall be understood, however, that in either or both of these chambers the tubes may extend transversely to the radiation chambers, or at any other suitable angle with respect thereto, whether inclined or horizontal. Figs. 1 and 3, whatever be the direction of extent of the tubes T2 with respect to the radiation chambers 11, the latter alone or with the transverse manifold chamber 14 occupy a longitudinal extent substantially greater than the longitudinal extent of the space occupied by the tubes T2, for increasing or enhancing the rate of application of heat to the tubes T2 in which the petroleum or other fluid is rapidly and to great extent raised in temperature.

While the tubes T2 are or may be continuous through the wall 27 with some or all of the tubes T3 nevertheless the tubes T2 and T3 constitute, at least for facility in description, different absorption structures. In the example illustrated, the length of the fluid path through the tubes T3 is materially greater than through the tubes T2.

Where referring to rates of heat transfer, whether of a high or a low rate, they shall be understood to mean the number of units of heat per unit of area of heat absorbing surface per unit of time; for example, British thermal units (B. t. u.) per square foot per hour. By way of example, but without limitation of my invention thereto, it may be stated that the rate of radiation of heat to the absorption structure T2 in chamber R2 may be as great as of the order of 50,000 B. t. u. per square foot per hour, while in the chamber R3 the rate of application of heat, whether by convection or radiation, or both, to the structure T3 may be at the same time of the order of 5,000 or 10,000, or as low as 3,000 B. t. u. per square foot per hour.

In some heat transfer systems, particularly in the cracking of petroleum or its products, it is of advantage to raise the temperature of the oil as rapidly as possible in the early stage or stages of temperature rise, to or beyond a point at which cracking occurs, and thereafter to apply heat at materially lower rate to the oil passing through additional tubular structure in which nevertheless the cracking proceeds or continues, and in which excessive deposition of coke or carbonaceous material would occur if heat were applied at the rate of application of heat to the preceding zone or tube bank. To procure this advantage my system of control of application of heat above referred to is suitable, particularly in that in the chamber R2, for example, the rate of application of heat per unit of area of the tube structure T2 is very much higher than in the chamber R3 to the tubes T3.

In the example illustrated, either one of the chambers R1, R2 or R3 bears the relation to the chamber C such as described and claimed in prior Letters Patent No. 1,591,431, July 6, 1926 to Nash and myself, for that the convection and radiant components which are substantially separately and independently applied to different heat absorption structure.

In connection with the transfer of heat in separate zones of a heating system, reference may be had to the copending application Serial No. 164,682, filed January 31, 1927, by Nash and Alcorn, entitled "Heat transfer system" and assigned to the assignee of the present application and invention. I do not herein claim subject matter disclosed or claimed in said Nash and Alcorn application.

The method of treating petroleum or other oil so far as herein referred to is per se not my invention which is limited to a method of and apparatus for transfer of heat particularly to petroleum and to other fluids.

What I claim is:

1. The method of transferring heat to a fluid, which comprises generating heat by combustion, applying heat substantially solely by convection to a heat absorption structure, applying heat substantially solely by radiation to another heat absorption structure at high rate per unit of area of heat absorption surface per unit of time, applying heat to another absorption structure substantially solely by radiation at a rate which is low relatively to the rate of application of heat to said second named structure, and passing the fluid in succession through said heat absorption structures in the order named.

2. The method of transferring heat to a fluid, which comprises generating heat by combustion, applying heat by convection to a heat absorption structure, applying heat by radiation to a second heat absorption structure, applying heat substantially solely by radiation to a third absorption structure at a high rate per unit of area of heat absorption surface per unit of time, transferring heat to a fourth absorption structure at a rate which is relatively low compared to the rate of application of heat to said third absorption structure, and passing the fluid in succession through sa:d heat absorption structures in the order named.

3. The method of transferring heat to a fluid, which comprises generating heat by combustion, transferring heat to an absorption structure, transferring heat substantially solely by radiation to another absorption structure at high rate per unit of area of heat absorption surface per unit of time, transferring heat to a third absorption structure substantially solely by radiation at a rate less than about one-fifth the rate of application of heat to said second structure, and passing the fluid through said absorption structures in the order named.

4. The method of transferring heat to petroleum to raise it to cracking temperature, which comprises generating heat by combustion, applying heat substantially solely by convection to a heat absorption structure, applying heat substantially solely by radiation to another heat absorption structure at high rate per unit of area of heat absorption surface per unit of time, applying heat to another absorption structure substantially solely by radiation at a rate which is low relatively to the rate of application of heat to said second named structure, and passing the petroleum through said heat absorption structures in succession in the order named.

5. The method of transferring heat to petroleum, which comprises generating heat by combustion, applying heat by convection to a heat absorption structure, applying heat by radiation to a second heat absorption structure, applying heat substantially solely by radiation to a third absorption structure at a high rate per unit of area of said third absorption structure per unit of time, transferring heat to a fourth absorption structure at a rate which is relatively low compared to the rate of application of heat to said third absorption structure, and passing the petroleum in succession through said heat absorption structures in the order named.

6. The method of transferring heat to petroleum, which comprises generating heat by combustion, transferring heat to an absorption structure, transferring heat substantially solely by radiation to another absorption structure at high rate per unit of area of heat absorption surface per unit of time, transferring heat to a third absorption structure substantially solely by radiation at a rate less than about one-fifth the rate of application of heat to said second structure, and passing the petroleum through said absorption structures in the order named.

7. A heat transfer system, comprising separate heating chambers, banks of heat absorbing tubes disposed respectively in said chambers, a combustion system having heat radiating walls disposed in two of said chambers, means for controlling application of heat to the tubes in the different chambers at widely different rates per unit of surface of said tubes per unit of time comprising in at least one of said chambers radiating wall structure of said combustion system having radiating components of materially different radiating effects, and means for inter-connecting said tube banks for passage of fluid therethrough in succession.

8. A heat transfer system, comprising separate heating chambers, banks of heat absorbing tubes disposed respectively in said chambers, a combustion system having heat radiating walls disposed in two of said chambers, means for controlling application of heat to the tubes in the different chambers at widely different rates per unit of surface area of said tubes per unit of time comprising in at least one of said chambers radiating wall structure of said combustion system having radiating components of materially different radiating effects, a bank of tubes heated by gases discharged from said combustion system, and means inter-connecting said tube banks for passing fluid therethrough in succession.

9. A heat transfer system comprising separate heating chambers, banks of bare heat absorption tubes disposed respectively in said chambers, a combustion system having walls disposed in said chambers and constituting sources of heat radiated directly therefrom to said tubes, the source of radiant heat in one of said chambers occupying a portion thereof having a greater length than that portion of the said chamber occupied by the tubes therein, whereby radiation of heat to said tubes is effected at high rate per unit of area of said tubes per unit of time, and means for interconnecting said tube banks for passing fluid therethrough in succession.

10. A heat transfer system comprising separate heating chambers, banks of bare heat absorption tubes disposed respectively in said chambers, a combustion system having walls disposed in said chambers and constituting sources of heat radiated directly therefrom to said tubes, the source of radiant heat in one of said chambers occupying a portion thereof having a greater length than that portion of the said chamber occupied by the tubes therein, whereby radiation of heat to said tubes is effected at high rate per unit of area of said tubes per unit of time, and means for reducing the rate of radiation of heat to the tubes in another of said chambers comprising division of the radiating wall structure in said other of said chambers into components having different heat radiating effects.

11. A heat transfer system comprising separate heating chambers, banks of bare heat absorption tubes disposed respectively in said chambers, a combustion system having heat radiating walls disposed in said chambers, the total cross section of said combustion system in one of said chambers being less than in the preceding chamber, and means for passing fluid in succession through said tube banks.

12. A heat transfer system comprising separate heating chambers, banks of bare heat absorption tubes disposed respectively in said chambers, a combustion system having heat radiating walls disposed in said chambers, the total cross section of said combustion system in one of said chambers being less than in the preceding chamber, the radiating wall structure in one of said chambers having components of materially different heat radiating effects, and means for passing fluid in succession through said tube banks.

13. A heat transfer system comprising separate heating chambers, banks of heat absorption tubes disposed respectively in said chambers, a combustion system having heat radiating walls disposed in said chambers, said combustion system in one of said chambers comprising a plurality of radiation combustion chambers, a manifold chamber with which said combustion chambers connect, and radiation combustion chambers in another of said heating chambers connected to said manifold, and means for passing fluid through said tube banks in succession.

14. A heat transfer system comprising separate heating chambers, banks of heat absorption tubes disposed respectively in said chambers, a combustion system having heat radiating walls disposed in said chambers, said combustion system in one of said chambers comprising a plurality of radiating combustion chambers and a manifold radiating chamber connecting therewith, said combustion system in another of said chambers comprising a plurality of radiating combustion chambers connected to said manifold, and means for passing fluid through said tube banks in succession.

15. A heat transfer system comprising separate heating chambers, banks of heat absorption tubes disposed respectively in said chambers, a combustion system having heat radiating walls disposed in said chambers, said combustion system in one of said chambers comprising a plurality of radiating combustion chambers and a manifold radiating chamber connecting therewith, said combustion system in another of said chambers comprising a plurality of radiating combustion chambers connected to said manifold, said radiating combustion chambers in said other heating chamber having radiating wall components of materially different heat radiating effects, and means for passing fluid through said tube banks in succession.

16. A heat transfer system comprising separate heating chambers, banks of heat absorption tubes disposed respectively in said chambers, a combustion system having heat radiating walls disposed in said chambers, said combustion system in one of said chambers comprising a plurality of radiating combustion chambers and a manifold radiating chamber connecting therewith, said combustion system in another of said chambers comprising a plurality of radiating combustion chambers connected to said manifold, the said radiating combustion chambers in said other heating chamber having a total cross section less than the total cross section of the radiating combustion chambers in the preceding heating chamber, and means for passing fluid in succession through said tube banks.

17. The method of transferring heat to a fluid, which comprises generating heat by combustion, applying a portion of the heat generated substantially solely by radiation to a bare tubular heat absorption structure at a rate of the order of 50,000 B. t. u. per square foot per hour, applying another portion of the generated heat to another bare tubular heat absorption structure at a rate less than one-third the aforesaid rate, and passing the fluid to be heated through said heat absorption structures in succession in the order named.

18. The method of transferring heat to petroleum in a cracking system, which comprises generating heat by combustion, applying a portion of the heat generated substantially solely by radiation to bare tubular heat absorption structure at a rate of the order of 50,000 B. t. u. per square foot per hour, applying another portion of the heat generated to another bare tubular heat absorption structure at a rate less than one-third the aforesaid rate, and passing the petroleum through said heat absorption structures in succession in the order named.

19. The method of transferring heat to petroleum in a cracking system, which comprises generating heat by combustion, applying a portion of the heat generated substantially solely by radiation to bare tubular heat absorption structure at a rate of the order of 50,000 B. t. u. per square foot per hour, applying another portion of the heat generated to another bare tubular heat absorption structure at a rate less than about one-fifth the aforesaid rate, the path through said second tubular structure being materially greater than the length of the path through said first mentioned tubular structure, and passing the petroleum through said heat absorption structures in succession in the order named.

20. The method of transferring heat to petroleum which comprises generating heat by combustion on one side of wall structure, applying a part of the heat generated and conducted through said wall structure substantially solely by radiation from the opposite side of said wall structure to bare tubular heat absorption structure at a rate of the order of 50,000 B. t. u. per square foot per hour, applying another part of the generated heat to another bare tubular heat absorption structure at a rate less than about one-fifth the aforesaid rate, and passing the petroleum in succession through said heat absorption structures in the order named.

21. A heat transfer system comprising separate heating chambers, banks of bare heat absorbing tubes disposed respectively in said chambers, a radiation combustion chamber common to said heating chambers, means in said radiation combustion chamber for burning fuel therein, the hot gases traversing the portions of said radiation combustion chamber in heat transfer relation with the different heating chambers in succession, means for interconnecting said tube banks for passage of fluid therethrough in succession, and means for causing the application of heat substantially solely by radiation from said radiation combustion chamber to the tubes in the different heating chambers at widely different rates per unit of area of said tubes per unit of time comprising, in at least one of said heating chambers, in the wall structure of said radiation combustion chamber heat radiating elements of materially different radiating effects.

22. A heat transfer system comprising separate heating chambers, banks of bare heat absorption tubes disposed respectively in said chambers, a radiation combustion chamber common to said heating chambers and having wall structure radiating heat to the tube banks in the different heating chambers, means for effecting combustion in said radiation combustion chamber, the length of that portion of said radiation combustion chamber in one of said heating chambers being materially greater than the portion of said heating chamber occupied by the tubes therein, whereby radiation of heat to said tubes is effected at high rate per unit of area of said tubes per unit of time, and means for interconnecting said tube banks for passing fluid therethrough in succession.

23. A heat transfer system comprising separate heating chambers, banks of heat absorption tubes disposed respectively in said chambers, a radiation combustion chamber common to said heating chambers having wall structure radiating heat to the tube banks in said heating chambers, the cross section of said radiation combustion chamber being less in one of said heating chambers than in the preceding heating chamber, and means for interconnecting said tube banks for passage of fluid therethrough in succession.

24. A heat transfer system comprising separate heating chambers, interconnected heat absorption structures disposed respectively in said chambers, a plurality of radiation combustion chambers in one of said heating chambers, a radiation combustion chamber comprising a manifold connected to said radiation combustion chambers and radiation combustion chambers connected to said manifold and disposed in another of said heating chambers.

25. A heat transfer system comprising a plurality of heating chambers, interconnected heat absorption structures disposed respectively in said heating chambers, and means for radiating heat to the absorption structures in the different heating chambers comprising a radiation combustion chamber having portions disposed respectively in said different heating chambers, a radiating wall structure of said radiation combustion chamber in at least one of said heating chambers comprising elements respectively having materially different radiating effects.

26. A heat transfer system comprising heat absorption structure, a radiation combustion chamber, and means for effecting combustion therein, said radiation combustion chamber comprising radiating wall elements respectively having materially different radiating efficiencies and disposed along said radiation combustion chamber.

27. A heat transfer system comprising heat absorption structure, a radiation combustion chamber, and means for effecting combustion therein, said radiation combustion chamber having radiating wall elements respectively having materially different radiating effects and alternating with each other throughout at least a portion of the length of said radiation combustion chamber.

28. The method of heating oil, which comprises passing it in succession through heat absorption structures in different zones, generating heat by combustion in a plurality of separate streams of combustion gases, passing said gases in a less number of streams through at least one zone and in at least another of said zones uniting in a single stream all of said separate streams of combustion gases, transferring by convection a portion of the heat generated to one of said heat absorption structures in one of said zones in a second of said zones without the streams of said gases, transferring substantially solely by radiation a portion of the generated heat to a second of said heat absorption structures, in a third zone without the streams of said gases, transferring substantially solely by radiation part of the generated heat to a third of said heat absorption structures at a high rate per unit of area of said third absorption structure per unit of time, and in a fourth of said zones without the streams of said gases transferring heat substantially solely by radiation to another of said absorption structures at a rate which is low relatively to the rate of application of heat to said third-named structure.

29. An oil heating system comprising a plurality of chambers in communication with each other, burner means for producing a plurality of independent streams of hot combustion gases through at least one of said chambers, tubular oil conducting heat absorbing structure disposed to receive heat by convection from all of said streams of gases, tubular oil conducting heat absorbing structure disposed in a second of said chambers without the path of said combustion gases and absorbing heat substantially solely by radiation at a high rate per unit of area of heat absorption surface of said second structure per unit of time, a third oil conducting heat absorption structure disposed within another of said chambers without the streams of gases to absorb heat substantially solely by radiation at a rate which is relatively low compared to the rate of application of heat to said second heat absorption structure, and means for interconnecting said structures for passage of oil therethrough in succession in the order named.

JAMES S. ALCORN.

CERTIFICATE OF CORRECTION.

Patent No. 2,101,835. December 14, 1937.

JAMES S. ALCORN.

It is hereby certified that error appears in the printed specification of the above numbered patent requiring correction as follows: Page 1, second column, line 5, after the word "oil" insert a comma; page 3, first column, line 49, for "which" read of the generated heat; line 51, for "structure" read structures; page 5, second column, line 19, claim 24, after "chambers" first occurrence, insert a comma; line 63, claim 28, after "gases" strike out the comma and insert the same after "zones", line 61, same claim; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.

tively to the rate of application of heat to said third-named structure.

29. An oil heating system comprising a plurality of chambers in communication with each other, burner means for producing a plurality of independent streams of hot combustion gases through at least one of said chambers, tubular oil conducting heat absorbing structure disposed to receive heat by convection from all of said streams of gases, tubular oil conducting heat absorbing structure disposed in a second of said chambers without the path of said combustion gases and absorbing heat substantially solely by radiation at a high rate per unit of area of heat absorption surface of said second structure per unit of time, a third oil conducting heat absorption structure disposed within another of said chambers without the streams of gases to absorb heat substantially solely by radiation at a rate which is relatively low compared to the rate of application of heat to said second heat absorption structure, and means for interconnecting said structures for passage of oil therethrough in succession in the order named.

JAMES S. ALCORN.

CERTIFICATE OF CORRECTION.

Patent No. 2,101,835. December 14, 1937.

JAMES S. ALCORN.

It is hereby certified that error appears in the printed specification of the above numbered patent requiring correction as follows: Page 1, second column, line 5, after the word "oil" insert a comma; page 3, first column, line 49, for "which" read of the generated heat; line 51, for "structure" read structures; page 5, second column, line 19, claim 24, after "chambers" first occurrence, insert a comma; line 63, claim 28, after "gases" strike out the comma and insert the same after "zones", line 61, same claim; and that the said Letters Patent should be read with these corrections therein that the same may conform to the record of the case in the Patent Office.

Signed and sealed this 5th day of April, A. D. 1938.

(Seal)

Henry Van Arsdale,
Acting Commissioner of Patents.

CERTIFICATE OF CORRECTION.

Patent No. 2,101,835. December 14, 1937.

JAMES S. ALCORN.

It is hereby certified that error appears in the printed specification of the above numbered patent requiring correction as follows: Page 1, second column, line 5, after the word "oil" insert a comma; page 3, first column, line 49, for "which" read of the generated heat; line 51, for "structure" read structures; page 5, second column, line 19, claim 24, after "chambers" first occurrence, insert a comma; line 63, claim 28, after "gases" strike out the comma and insert the same after "zones", line 61, same claim; and that the said Letters Patent should be read with these corrections therein that the same may conform to the record of the case in the Patent Office.

Signed and sealed this 5th day of April, A. D. 1938.

(Seal).

Henry Van Arsdale,
Acting Commissioner of Patents.